May 31, 1960

R. ROSEBROOK 2,938,702

TRACER VALVE

Filed Oct. 29, 1956

INVENTOR.
ROY ROSEBROOK
BY
D. Gordon Angus
ATTORNEY.

May 31, 1960

R. ROSEBROOK 2,938,702

TRACER VALVE

Filed Oct. 29, 1956

INVENTOR.
ROY ROSEBROOK
BY
D. Gordon Angus
ATTORNEY.

United States Patent Office 2,938,702
Patented May 31, 1960

2,938,702
TRACER VALVE

Roy Rosebrook, Montebello, Calif., assignor, by mesne assignments, to Banstrom Industries, Inc., Los Angeles, Calif., a corporation of Connecticut Filed Oct. 29, 1956, Ser. No. 619,010

2 Claims. (Cl. 251—3)

This invention relates to tracer mechanism, and more particularly to a tracer mechanism adapted for use with hydraulically operated duplicating devices wherein the tracer mechanism controls hydraulic motors for causing relative movements of a cutting tool and a work piece, in order to reproduce the shape of a template or pattern, or the like in the work piece.

An object of this invention is to provide a tracer valve capable of controlling the relative shifting of the work piece and cutting tool so that external force on these elements have less ability to override the tracer valve control. For example, in climb milling, the milling cutter tends to force the work piece and carriage to move, independently of the power supplied by the tracer valve. The valve of this invention represses this override tendency. A related object is to provide a tracer valve which can provide a low feed rate without chattering.

Still another object of this invention is to provide a manifolded valve which provides both quick action and delicate control in a convenient and useful single valve structure.

It is well known that in milling operations which are powered by hydraulic means, and which have tracer valves for governing the hydraulic flow, the forces exerted by a milling cutter, particularly in climb milling, is frequently sufficient to pull hydraulic fluid into the pressure side of the cylinder. This results in a feed rate which is higher than the rate which is established by the tracer valve.

Furthermore, in tracer valves, rate controls must frequently be set so as to provide a minimum rate of feed. At this rate of speed, chattering often takes place, because the stylus opens the valve by only a very small amount to control movement at slow rates. A chattering of the valve frequently occurs because of latent instabilities in the system which become important when the valve is only slightly opened.

Conventional tracer valves are unable to cope with these problems, and when high power is used on the cutting tool, and low feed rates are used, low tolerances and poor finishes occasionally result. The tracer valve of this invention overcomes many of these problems.

This invention is carried out in combination with a tracer valve having a pivotally mounted stylus which has a tip for tracing along a template or pattern. The stylus is tilted so that the tip contacts a pattern or template. This tilting action shifts the spool of a spool valve to direct hydraulic fluid under pressure to hydraulic motors. The hydraulic motors shift the work piece and the cutting tool relative to each other, and the machinery moves so as to nullify the stylus movement by the template's forcing the stylus to resume a neutral position. The cutter is thereby caused to duplicate the contour of the template.

According to this invention, an adjustable restrictor valve is disposed in the hydraulic line between the tracer valve and the hydraulic motor for adjustably limiting the rate of flow of fluid through said line.

A preferred but optional feature of this invention resides in an adjustable master restrictor valve in the hydraulic line which supplies hydraulic fluid under pressure to the tracer valve. This master restrictor valve provides a limitation on the relative shifting of the work piece and cutting tool which is independent of the stylus control. It tends to overcome the effects of cutting tool forces which tend to shift the work piece and cutting tool without reference to the tracer valve.

The above and other features of this invention will be fully understood from the following detailed description and the accompanying drawings, of which:

Figure 1:
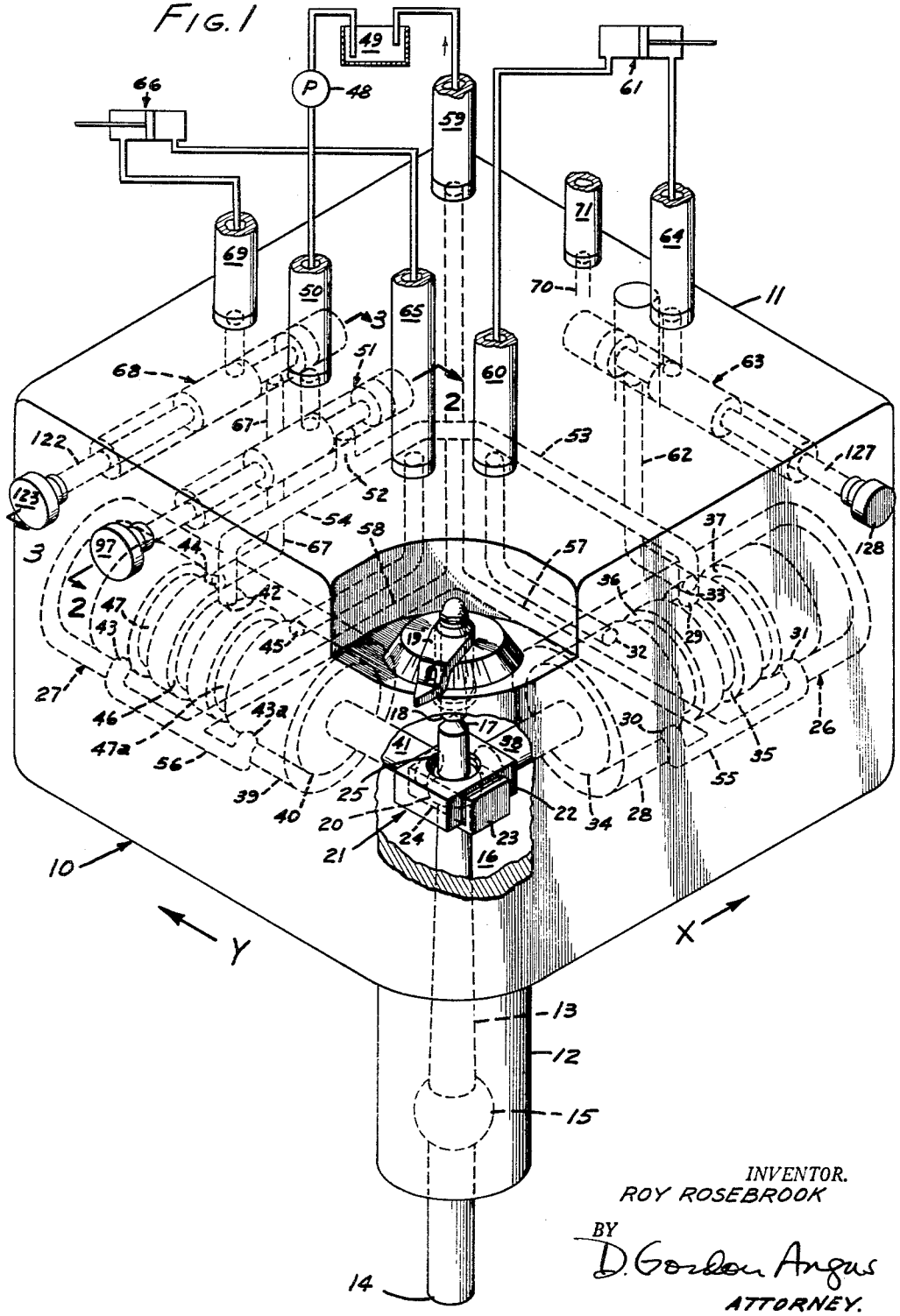
Fig. 1 is a perspective view, partly in cutaway cross-section, and partly in schematic notation, of a tracer valve incorporating the invention.

In Fig. 1 there is shown a perspective view of a tracer valve 10 incorporating the invention. This valve is the control unit for shifting a cutting tool and a work piece relative to each other so as to duplicate the contour of a template or pattern. The relative shifting movement may be accomplished either by moving a work table which supports the work piece, or by moving the cutting tool itself, or by any combination of the two. The actual movement of the element which is to be shifted may conveniently be accomplished by hydraulic motors. A hydraulic cylinder and piston assembly is one well-known form of hydraulic motor.

The application of a tracer valve to a machine tool for this purpose is well-known. For a complete description of a machine tool which utilizes a tracer valve of this general type, reference may be had to my Patent Number 2,753,145, issued July 3, 1956.

The tracer valve has a body 11 with a depending hollow neck 12 beneath the body. A tracer stylus 13 is pivotally mounted in the neck. The stylus has a lower template-engaging tip 14 which extends below the lower end of the neck 12. A ball-like member 15 is incorporated at a medial point of the stylus, and serves as a pivotal mounting for the stylus. The stylus tip can be swung in any lateral direction, with the ball acting as a fulcrum. There is no restriction on the direction in which the lower tip of the stylus can swing. The surrounding structure, of course, limits the extent of the total swing of the stylus.

There is a chamber 16 in the body into which the neck opens. The upper portion of the stylus extends into this chamber. At the tip of the stylus there is a non-planar surface 17 which cooperates with a mating surface (not shown) on the end of an axially movable member 18. The member is shifted up and down by turning the arm 19. The non-planar surface and member 18 form a traverse rate control which is described in detail in my aforesaid Patent Number 2,753,145. Reference may be had to this patent for further details. This traverse rate control does not form a part of this invention, and will not be discussed further herein.

A second ball-like member 20 is incorporated in the stylus on the opposite side of the first ball-like member 15. A yoke 21 comprising two U-shaped members 22, 23 and a block 24, are fitted around the ball-like member 20. The U-shaped members are crossed and opposed relative to each other so as to contain the block within them. Holes 25 through the block and the bights of the U-shaped members permit the stylus to pass through the yoke. The second ball-like member 20 fits snugly within the block 24.

Tilting the stylus moves the second ball-like member in some direction. The second ball-like member then moves the block horizontally in that same direction, which is opposite to the movement of the stylus tip. Movement of the block shifts the U-shaped members in the X and Y components of the motion of the block. This yoke mounting is more fully disclosed in the aforesaid Patent Number 2,753,145, to which reference may be had for additional details, because the yoke mounting forms no part of this invention.

An X-axis spool valve 26 and a Y-axis spool valve 27 are placed at right angles to each other, and to the neutral (vertical) position of the stylus. Spool valve 26 comprises a cylinder 28 with a pressure inlet port 29 and a pair of X axis outlet ports 30, 31. Power cylinder supply ports 32, 33 also open into the cylinder 28.

An X-axis spool 34 is disposed in the cylinder 28 so as to be axially slidable therein. The spool has a central peripheral pressure groove 35 which is always in fluid communication with pressure inlet port 29. Peripheral exhaust grooves 36, 37 are located on opposite sides of the pressure groove from each other. These exhaust grooves are placed in fluid communication with X-axis outlet port 30 or 31, when the spool is shifted toward or away from the stylus, respectively.

A rod 38 joins X-axis spool 34 to U-shaped member 22. The spool is thereby movably mounted to the second ball-like member 20 of the stylus through the yoke 21.

Y-axis spool valve 27 comprises a cylinder 39 having an axially slidable Y-axis spool 40 therein. Spool 40 is joined to U-shaped member 23 by a rod 41, and is thereby mounted to the second ball-like member 20 of the stylus through the yoke 21.

The Y-axis cylinder 39 has a pressure inlet port 42 and a pair of outlet ports 43, 43a opening thereinto. Y-axis power cylinder supply ports 44, 45 also open into the cylinder.

The Y-axis spool has a central peripheral pressure groove 46 which is always in fluid communication with inlet port 42. Peripheral exhaust grooves 47, 47a are located on opposite sides of the pressure groove from each other. These exhaust grooves are placed in fluid communication with outlet port 43a or 43 when the spool is shifted toward or away from the stylus, respectively.

A pump 48 withdraws and pressurizes hydraulic fluid from a reservoir 49. The pressurized fluid is supplied to pressure inlet 50, which is controlled by a master restrictor valve 51. Master restrictor valve 51 will be described in further detail below.

Conduit 52 receives pressurized fluid from master restrictor valve 51, and branches into pressure supply conduits 53 and 54. Conduits 53 and 54 are connected to pressure inlet ports 29 and 42 respectively.

Outlet ports 30 and 31 in the X-axis spool valve are interconnected by a manifold 55. Outlet ports 43 and 43a in the Y-axis spool valve are interconnected by a manifold 56. Conduits 57, 58 connect the manifolds 55 and 56, respectively, to an exhaust conduit 59. The exhaust conduit 59 discharges into the reservoir 49.

The above-described conduits provide pressurized fluid to the spool valves, and scavenge exhausted fluid therefrom. It is the function of the spool valves to direct the pressurized fluid to the hydraulic motors which will cause the desired relative movement of the cutting tool and workpiece. The spool valves also direct the exhausted, depressurized fluid from the motors into the conduits which lead to the exhaust conduit 59.

Motor supply conduit 60 leads from X-axis power cylinder support port 32 to one side of X-axis hydraulic motor 61. Motor supply conduit 62 leads from X-axis motor cylinder supply port 33 to a motor supply restrictor valve 63 which will be further described below. Motor supply conduit 64 is the continuation of conduit 62 beyond the restrictor valve 63, and connects to the other side of X-axis hydraulic motor 61.

Motor supply conduit 65 leads from Y-axis power cylinder supply port 45 to one side of Y-axis hydraulic motor 66. Motor supply conduit 67 leads from Y-axis power cylinder supply port 44 to a motor supply restrictor valve 68 which will be further described below. Motor supply conduit 69 is a continuation of conduit 67 beyond the restrictor valve 68, and connects to the other side of Y-axis hydraulic motor 66.

In the event that scavenging of seeping hydraulic fluid is required, a bore 70 may be sunk into the valve body to any regions to be scavenged. Vacuum is applied at fitting 71 to remove the fluid.

In accordance with common practice, the conduits in this tracer valve are formed by drilling intersecting holes, some of which are plugged at the surface of the block 11. The ports in the cylinders comprise holes through sleeves which contain the cylinder. This is a well-known construction expedient for hydraulic valves.

The mechanism of master restrictor valve 51, which is shown in detail in Fig. 2, will now be described. It is conveniently placed in a cylindrical bore 72 which passes through the body of the tracer valve. Cylindrical inserts 73, 74, 75, and a retainer 76, which form part of this valve mechanism, are held in abutment by plugs 77 and 78. Boss 79 on plug 77 acts as a limit stop for the valve mechanism. Boss 80 on plug 78 acts as a base for parts of the valve mechanism. Sleeve 81 is pressed into the tracer valve body, and has a central bore which constitutes cylinder 39.

A valve stem 82 is slidably disposed within sleeve 74. A key 83 in the sleeve slides in a key groove 84 in the stem to prevent the valve stem from rotating. A boss 85 on the valve stem is adapted to strike boss 79 at its farthest position to the left in Fig. 1.

The valve stem 82 is provided with three O ring grooves 86, 87 and 88, which hold O rings 89, 90 and 91, respectively. O rings 89 and 90 are on opposite sides of conduit 52. O rings 90 and 91 are substantially on opposite sides of conduit 50. Holes 92 and 93 are drilled through the side of insert 74 to continue conduits 50 and 52 respectively.

Valve edge 94 at hole 92 is adapted to be contacted by O ring 90 to shut off flow between conduits 50 and 52. A section 95 of the stem adjacent to conduit 52 is turned down to permit fluid to flow from conduit 50 to conduit 52 when the O ring 90 is unseated from edge 94.

A threaded sink 96 in the right hand end of the stem receives a threaded rotatable adjustment screw 97. This screw has a gear 98 attached thereto which acts as a collar to keep it from shifting longitudinally. The screw passes through the insert 76 and the plug 78. It also projects through cover plate 99. Turning this adjustment screw therefore shifts the valve stem.

A cylindrical stop 100 is fixed to the retainer 76. This stop surrounds the screw and limits movement of the stem to the right in Fig. 2. A coil spring 101 is opposed between retainer 76 and the valve stem for the purpose of eliminating backlash between the screw and stem, and also for biasing the screw to the left. This spring thereby eliminates any looseness of fit in the means for adjusting the stem position.

Figure 2:
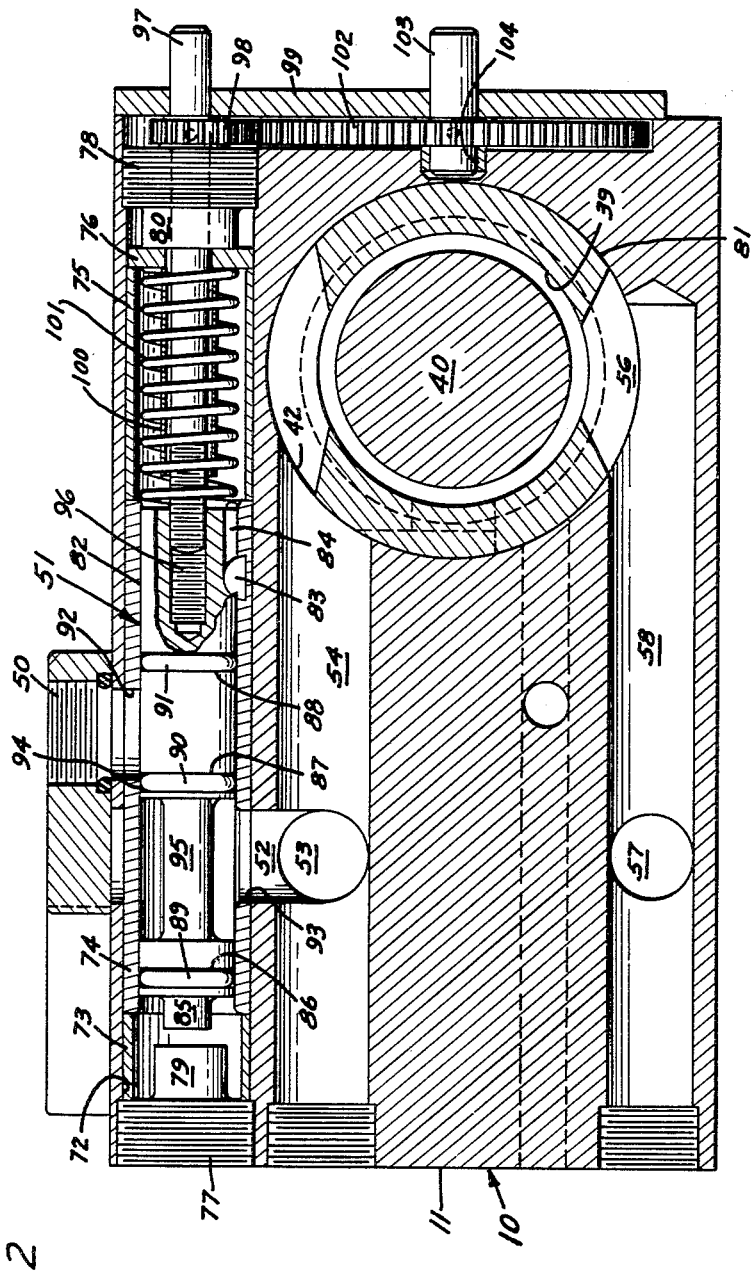
Fig. 2 is a view, partly in cross-section, taken at line 2—2 of Fig. 1.

In the event that it is desired to adjust the stem position at a different rate than is conveniently obtainable from simply turning screw 97, a second gear 102 can be mounted to shaft 103 as shown in Fig. 2. This shaft is journaled in a sink 104. Gear 102 has a larger radius than gear 98 and is meshed thereto. If the shaft 103 is turned to a given angle, screw 97 will be turned through a larger angle, but the amount by which the screw is moved can be closely determined from examining a dial (if provided) on the shaft 103.

Figure 3:
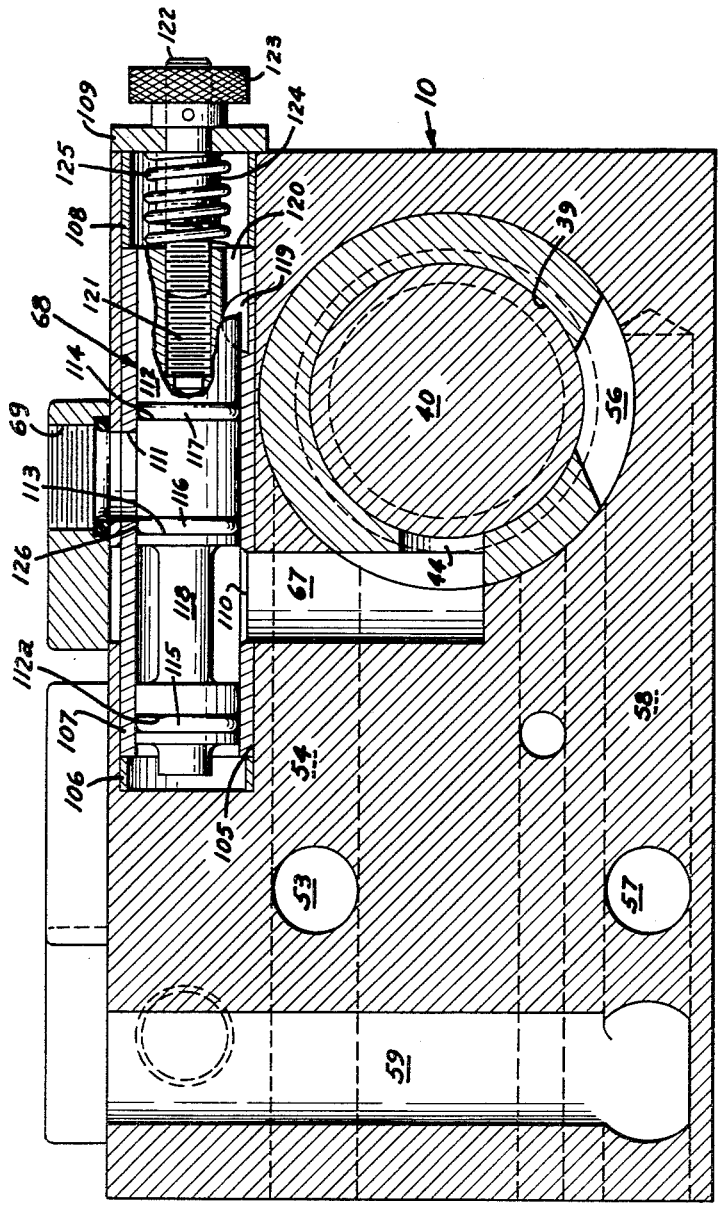
Fig. 3 is a view, partly in cross-section, taken at line 3—3 of Fig. 1.

Restrictor valves 63 and 68 are identical. Therefore only restrictor valve 68 will be described in detail, it being understood that each of these valves has corresponding parts. With particular reference to Fig. 3, restrictor valve 68 is shown in a cylindrical bore 105. A spacer 106, insert 107, and spacer 108 abut each other, and are held in firm abutment by a cover plate 109. Insert 107 has a hole 110 to continue conduit 67, and another hole 111 to continue conduit 69.

Valve stem 112 is slidably disposed within the inserts. Three O ring grooves 112a, 113 and 114 are provided on the stem, which hold O rings 115, 116 and 117, respectively. O rings 115 and 116 are on opposite sides of conduit 67, and O rings 116 and 117 are substantially on opposite sides of conduit 69. The term "valve seal" is used interchangeably with the term O ring for O rings which are movable into contact with a valve seat to control fluid flow. A reduced-diameter section 118 of the stem between O rings 115 and 116 permits fluid flow between conduits 67 and 69.

A key 119 is fastened in insert 107. This key fits into a longitudinal keyway 120 in the stem and keeps the stem from rotating.

A threaded bore 121 in the end of the stem receives a threaded shaft 122, this shaft projecting through cover plate 109. A knurled collar 123 is pinned to the shaft in order to turn the shaft and also to pull on the stem.

A cylindrical limit stop 124 is fixed to the cover plate 109. This limits movement of the stem to the right in Fig. 3. A coil spring 125 is placed between the stem and the cover plate to eliminate backlash in the threads, and to bias the stem to the left.

Valve edge 126 at holes 111 is so disposed that it may be contacted by O ring 116 to shut off flow in either direction between conduits 67 and 69.

For convenience in disclosure, the shaft in restrictor valve numbered 122 in valve 68, is denoted by number 127 in restrictor valve 63 (see Fig. 1) and likewise, collar 123 is denoted by number 128 in valve 63. With these exceptions, the structural elements of valves 63 and 68 are denoted by the same numbers. It will be understood that restrictor valve 63 controls the flow between conduits 62 and 64, while valve 68 controls flow between conduits 67 and 69.

In operation this tracer valve is first set up on the machine tool along with a template or pattern to be duplicated. A work piece and a cutting tool are adjusted in the same relative positions as the stylus and template. Then the cutting tool is rotated so that it will cut into the work piece and the tracer stylus is moved by hand over the surface of the pattern. Pivoting of the stylus around the ball like member 15 moves the upper end of the stylus 13 in an opposite direction therefrom. This causes the second ball like member 20 to move in this opposite direction.

The yoke 21, against which the second ball like member 20 progresses, acts to resolve the movement of said second ball like member into its X and Y components. These components are transmitted by rods 38 and 31 to spools 34 and 40, respectively, of the X-axis and Y-axis spool valves 26 and 27. The movement of the spools and the valves causes the peripheral grooves in the spools to be placed into selective fluid communication with conduits leading to the hydraulic motors.

As a single example, assume that the spool 34 is moved to the right as shown in Fig. 1. It will be recalled that pressure in inlet port 29 is always in connection with the central peripheral pressure groove 35 on X axes spool 34. Movement of the spool in the aforesaid direction, causes this groove 35 to overlap both the pressure inlet port 29 and the power cylinder supply port 33, thereby supplying pressurized fluid to the restrictor valve 63, and through the restrictor valve to conduit 64 which is directly connnected to hydraulic motor 61.

This same movement of the spool 34 causes exhaust groove 36 to be brought into registration with power cylinder supply port 32, which is in turn in communication with motor supply conduit 60. The exhaust groove 36 is also in registration with outlet port 30, and thereby the motor supply conduit 60 is connected through manifold 55 to exhaust conduit 59. The aforesaid valve adjustments and connections cause the piston in hydraulic motor 61 to be moved in the same direction as the tip of the stylus was moved. It is evident that this hydraulic motor may be used to shift either the workpiece or the cutting tool as desired. The reverse movement of spool 34 from that described above would cause the central peripheral pressure groove 35 to register with power supply port 32 thereby applying pressure to conduit 60, while exhaust groove 37 would be placed in registration with power cylinder supply port 33 and with outlet port 31, whereby the conduits 64 and 62 would discharge into manifold 55 and thence through conduit 59 to the reservoir. It will be appreciated that these valve arrangements and connections will reverse the direction of motion of hydraulic motor 61.

Irrespective of which direction the stylus is moved with a component in the X-axis, hydraulic fluid will pass in equal volume, through both conduits 60 and 64. One of these conduits will be connected to pressure and the other to reservoir, the particular connection depending on which way the stylus tip is moved. Evidently, the volume displaced from the low-pressure side of the piston must equal the volume introduced under pressure, because the cross-section of the cylinder in motor 61 is uniform. This relationship is strictly true when a double rod piston-cylinder combination, or a gear-type motor is used in which the volume change for a unitary movement of the motor is the same in both directions. In the device illustrated, wherein the piston rod projects from only one side of the piston, it will be understood that a slightly different volume of fluid is displaced in moving the piston the same distance in one direction than in the other. This effect is not particularly marked, inasmuch as the piston rod is of a considerably smaller diameter than the cylinder. The difference is usually of the order of about 5%. Whether or not the volumes are the same in either direction, it still remains true that the motor supply restrictor valve acts to restrict the rate of operation in either direction, regardless of the fact that it is physically connected only between conduits 62 and 64, and not in conduit 60.

The operation of the spool valve 27 to control flow through conduits 65 and 69 so as to operate hydraulic motor 66 are as just described for the X-axis spool valve 26, it being understood that spool valve 27 controls movement in the Y axis instead of the X axis. Restrictor valve 68 controls fluid through conduits 65 and 69 in both directions of flow for motor 66 in the same manner as restrictor valve 63 controls fluid for motor 61.

The mechanism and operation of restrictor valves 63 and 68 will be fully understood from reference to Fig. 3, wherein restrictor valve 68 is shown in detail. When it is desired to shut off movement in the Y-axis entirely independently of the movement of the stylus in the Y direction, the valve is closed by turning the knurled knob 123 counterclockwise when facing the right-hand side of the tracer valve as shown in Fig. 3 so as to turn the shaft and move the stem 112 to the left. This causes O ring 116 to make contact with valve edge 126, and also to pass beyond said edge, thereby shutting off flow between the conduits 67 and 69. Therefore, regardless of any movement of the stylus in the Y direction, no fluid can flow through either conduit 65 or 69, and hydraulic motor 66 will not operate. If it is desired to allow flow through restrictor valves 68 at some regulated rate, the knurled nut is turned clockwise so as to move the stem 112 to the right in Fig. 3. This removes the O ring 116 from the valve edge 126 and permits fluid to flow between conduits 67 and 69. It will be appreciated that the actual valve restriction between said two conduits is between the stem structure to the left of the O ring 113 and the valve edge. The O ring 116 makes a positive seal for shutoff, since the stem structure may permit some slight leakage without the O ring.

When the stem is moved to the right by the action of the shaft, the reduced-diameter section 118 of the valve stem is in registration with hole 111 to an extent determined by the distance of movement of the stem. A regulated flow of fluid may pass through the restrictor valve under this condition.

In the event that a quick and unrestricted flow of fluid through valve 68 is desired, the knurled knob 123 may be pulled to the right without turning the screw in its threads. This pulls the stem to the right and opens the valve. This open condition will persist so long as the knurled knob is held against spring 125. When the knob is released, this spring 125 returns the stem to the position determined by the positioning of the shaft 122 relative to the stem 112. This restrictor valve therefore provides both a delicate adjustment by means of the threaded joint relative to shaft 122 and stem 112, and also a quick traverse, wide-open valve condition obtained by pulling on the shaft, whereby the restrictor valve may be quickly opened wide for high volume flow of fluid.

It will be understood that the restrictor valve 63 operates in the same manner, knurled knob 128 being turned or pulled in the same manner as knurled knob 123, and for the same results in the control of motor 61.

The operation of master restrictor valve 51 will be described with particular reference to Fig. 2. This master restrictor valve is disposed in the hydraulic supply line which supplies pressurized fluid from the pump to spool valves 26 and 27. Therefore any restriction on this master restrictor valve is effective in regulating the maximum rate of operation of both of the hydraulic motors simultaneously. For that matter, the entire system may be shut down by closing this master restrictor valve.

The master restrictor valve is adjusted by turning the screw 97, which positions the valve stem 82 inside the valve. The valve stem is axially slidable, and is keyed against rotation by key 83. When the stem is positioned so that the O ring 90 engages the valve edge 94, as shown in Fig. 2, fluid flow is shut off. When flow is desired through the valve, the shaft 97 is turned clockwise to move the stem to the right, thereby withdrawing the O ring 90 from the valve edge 94, and also moving the portion of the stem which is to the left of O ring 87 past the valve edge 94. This permits flow between conduits 50 and 52. The rate of this flow is regulated by the extent of the opening between the valve stem and the valve edge 94. Cylindrical stop 100 limits the movement of the valve stem to the right. Abutment of bosses 79 and 85 limits the movement of the valve stem to the left.

Turning the screw 97 gives a fairly fine adjustment of the valve. For even closer adjustments, the shaft 103 may be turned so as to adjust the screw 97 through the gear train comprising gears 93 and 98.

The tracer valve provides means for controlling the rate of movement of the hydraulic motors, which means are independent of the stylus control. For example, it is possible to provide for a greater rate of movement in one direction than another, even though the stylus displacement may be the same. It is also possible to provide for a gross movement in one axis at a time, which is a convenient feature when setting up a machine. This is done by simply pulling either restrictor valve 63 or 68 out by the knob as appropriate, and displacing the stylus point.

The restrictor valves 63 and 68 are also useful in restraining the tendency of a machine to "creep," particularly in climb milling, because they act as an adjusted orifice to limit rate of fluid flow. The spool valves connected to the stylus can then be used as a close regulated variable orifice. This feature reduces chattering in machine installations.

It is frequently desired to exert an overall control on the rate of traverse such that a maximum rate may not be exceeded. For this purpose the master restrictor valve 51 is provided, which limits the pressure supply to both pistons. This master supply valve also prevents fluid from being drawn into the system from the pump because of forces exerted by the cutting tool, in a manner similar to that set forth in connection with valves 63 and 68. For example, if a cutting tool is operated with a power of 10 H.P. in climb milling, 10 H.P. is exerted on the workpiece, tending to move the work table. This considerable power tends to draw hydraulic fluid into the motor independently of the control position of the stylus, and may therefore result in poor tolerances on the completed work. By restricting the inward flow of fluid with restrictor valve 51, the possibility of fluid being drawn into the system is significantly reduced. This provides in effect, a stabilizing means whereby a relative positioning between the workpiece and cutting tool is maintained by the hydraulic system until the said position is changed as a result of stylus movement. It will be understood that restrictor valves 63 and 68 similarly repressed the tendency of the fluid to be drawn into the hydraulic motor along the axis of the spool valve with which they are associated.

This tracer valve provides a convenient valve which significantly speeds up machine operation, while increasing the accuracy of the work produced. It will be appreciated that all of the pressure supply lines, and all of the exhaust lines are manifolded, so that hose connections are minimized. The combination threaded and snap restrictor valves 63 and 68 are located directly on the tracer valve where the operator must be stationed anyway. These restrictor valves provide both coarse and fine rate adjustments for movement in the individual axes. The master restrictor valve, which is also located in the tracer valve body 11, provides for close adjustment of over-all valve rate.

This invention therefore provides a tracer valve which sets up an inherently more accurate and reliable machine tool control system. This invention is not to be limited to the embodiments shown in the drawing and described in the description, which are given by way of example, and not by way of limitation, but only in accordance with the accompanying claims.

I claim:
1. In a tracer valve which includes a pair of spool valves whose position is adjustable by a tracer stylus, a pair of motor supply conduits connected to each of said spool valves, a pressure inlet to said tracer valve which supplies fluid under pressure for each of said spool valves, said tracer valve having a pair of bores therein, the improvement comprising a pair of motor supply restrictor valves, one of said valves being disposed in each of said bores, said motor supply restrictor valves each comprising a valve seat, a valve stem within said bore, an O ring surrounding said valve stems so disposed and arranged as to make contact with said valve seat in one position with the valve stem so as to shut off fluid flow through the motor supply conduit in which it is disposed in one position thereof, and to restrict fluid flow in some other positions of said stem, and means for adjusting the axial position of said valve stem to adjust the amount of restriction to fluid flow comprising means for restraining said valve stem against rotation, a threaded bore in said stem, a threaded shaft threadedly attached to said stem and projecting through the tracer valve, so as to be axially slidable therein, and knob means for turning and pulling said shaft, for enabling said valve to be slowly or rapidly opened, each one of the spool valves being connected to an individual one of said motor supply restrictor valves, each motor supply restrictor valve being disposed in one of the motor supply conduits which is connected to its respective spool valve.

2. In combination, a tracer valve including a pair of spool valves adjustable by a tracer stylus, a pair of motor supply conduits connected to each of said spool valves, a pressure inlet to said tracer valve, a master restrictor valve connected to said pressure inlet, two pressure supply conduits, each interconnecting a respective one of said spool valves to the master restrictor valve, and an exhaust conduit branching to each of said spool valves, the positions of the spool valves as determined by the tracer stylus adjusting the spool valves to regulate the rate and direction of fluid flow through the motor supply conduits, two separate motor supply restrictor valves, each one of the spool valves being connected to an individual one of said motor supply restrictor valves, each motor restrictor valve being disposed in one of the motor supply conduits which is connected to its respective spool valve, said motor supply restrictor valves each comprising a valve seat, a valve stem within said bore, a valve seal on said valve stem so disposed and arranged as to make contact with said valve seat in one position of the valve stem so as to shut off fluid flow through the motor supply conduit in which it is disposed in one position thereof, and to permit fluid flow in some other position thereof, each motor supply restrictor valve being independently actuable for selective control of its respective motor supply conduit, and means for adjusting the positioning of said valve stem to adjust the amount of restriction to fluid flow through said valve comprising means for restraining said valve stem against rotation, a threaded bore in said stem, a threaded shaft threadedly attached to said stem and projecting from the tracer valve, and knob means for turning and pulling said shaft, for slowly or rapidly opening said motor supply restrictor valve, respectively, whereby the master restrictor valve controls flow through the pressure supply conduits, thereby restricting flow through both spool valves, and the motor supply restrictor valves each controls flow through an individual one of said spool valves.

References Cited in the file of this patent

UNITED STATES PATENTS

| | | |
|---|---|---|
| 2,157,240 | Keel | May 9, 1939 |
| 2,456,158 | Tancred | Dec. 14, 1948 |
| 2,585,328 | Johnson | Feb. 12, 1952 |
| 2,725,896 | Barker | Dec. 6, 1955 |
| 2,726,581 | Roehm | Dec. 13, 1955 |